United States Patent [19]

Diggs

[11] 4,023,500
[45] May 17, 1977

[54] HIGH-SPEED GROUND TRANSPORTATION SYSTEM

[76] Inventor: Richard E. Diggs, S. 12A Road, P.O. Box 776, Carthage, Mo. 64836

[22] Filed: Oct. 23, 1975

[21] Appl. No.: 625,139

[52] U.S. Cl. .................. 104/138 R; 104/23 FS; 104/48; 104/148 MS; 104/155; 105/365; 243/33; 243/39
[51] Int. Cl.² .................................. B61B 13/10
[58] Field of Search ....... 104/138 R, 138 G, 23 FS, 104/148 MS, 155, 48; 105/365; 243/1, 32, 33, 39

[56] References Cited

UNITED STATES PATENTS

| | | | |
|---|---|---|---|
| 1,183,198 | 5/1916 | Hills | 243/32 |
| 3,090,328 | 5/1963 | Berggren | 104/138 R |
| 3,404,638 | 10/1968 | Edwards | 104/138 R X |
| 3,442,223 | 5/1969 | Graham | 104/48 |
| 3,508,497 | 4/1970 | Matsukata | 104/138 R |
| 3,797,405 | 3/1974 | Carstens | 104/138 R X |
| 3,905,302 | 9/1975 | Fink et al. | 104/148 MS |
| 3,952,667 | 4/1976 | Kovanov et al. | 104/138 R |
| 3,954,064 | 5/1976 | Minovitch | 104/138 R |

FOREIGN PATENTS OR APPLICATIONS 628,897  11/1961  Italy ............... 104/138 R Primary Examiner—Robert J. Spar
Assistant Examiner—Randolph A. Reese
Attorney, Agent, or Firm—Shoemaker and Mattare, Ltd.

[57] ABSTRACT

A high-speed ground transportation system wherein a vehicle rides on a film of air and is propelled as a free piston through a tunnel by pneumatic pressure. Seals on the vehicle create fluid communication between a high pressure area behind the vehicle and the area beneath the vehicle while preventing fluid communication between that high pressure area and an evacuated area located in front of the vehicle, to create an air film beneath the vehicle upon which it rides. Cargo handling means are located near the tunnel and shunting means enable the vehicle to be shunted into those cargo handling areas when desired. Booster stations located at selected points serve to increase a pressure differential across a vehicle to assist that vehicle when necessary, and magnetic means are used to maintain the vehicle in a upright orientation as it is propelled through a tunnel.

19 Claims, 13 Drawing Figures

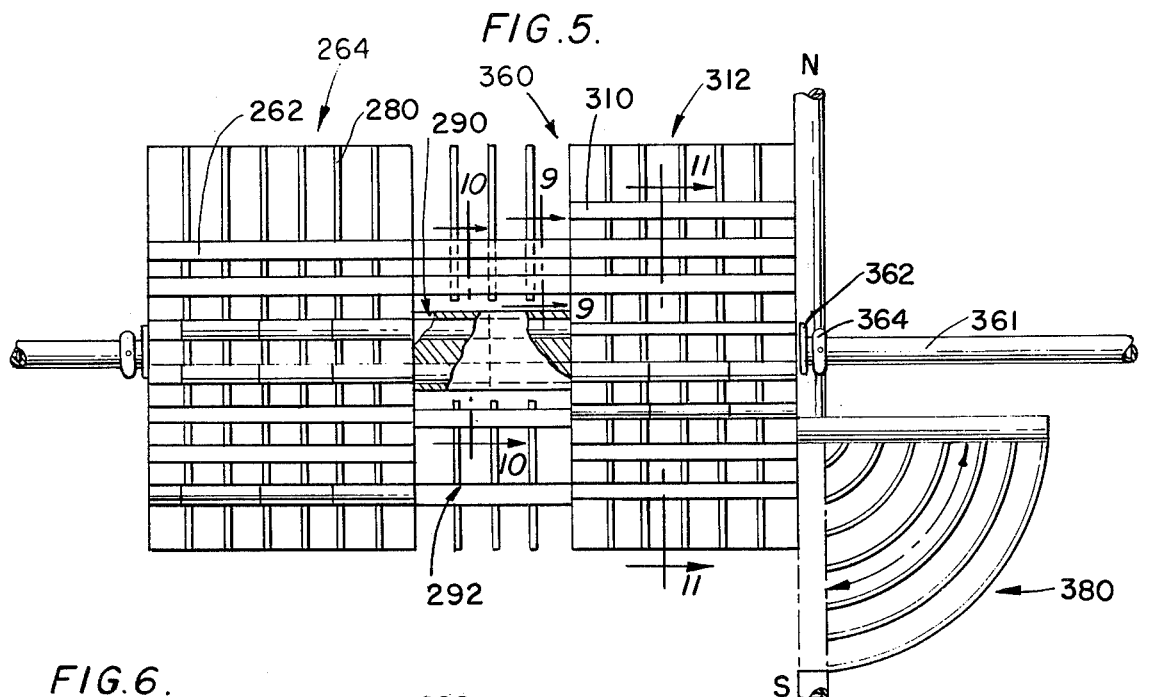

HIGH-SPEED GROUND TRANSPORTATION SYSTEM

BACKGROUND OF THE INVENTION

The present invention relates to ground transportation systems, and, more particularly, to transportation systems using pneumatic propulsion systems.

Due to many factors, the cost of transporting passengers and cargo over long distances has, in the last few years dramatically increased. As this cost continues to rise, shippers and transporters have sought more efficient ways of shipping cargo and transporting passengers.

The efficiency of known ground based systems, such as railroads and highways, is limited by several factors. One important factor is the speed with which such systems can move the cargo and/or passengers from place to place. Modern technology, such as computer technology and high-speed trains, have done much to speed up railroad movement, but railroads are still using the same basic concept of a wheeled vehicle being propelled over a track system which has been in use for decades. The friction factors and other mechanical losses inherent in such systems prevent them from attaining the speeds required for efficient ground transportation.

Friction losses involved in air transportation systems are much lower then those found in ground based systems, and therefore air transportation is capable of achieving speeds which greatly exceed those obtained by ground based transportation systems. However, air transportation systems have several drawbacks of their own. For example, airports are generally located far away from cities and/or connecting ground transportation systems. Furthermore, air transportation is often at the mercy of the vagaries of the weather and is hence often unreliable. A further drawback to air transportation is the cost involved due to the great number of people required to support air flights. These people include, for example, pilots, navigators and the ground support crews. Railroad systems are not similarly cost limited, but cannot obtain the speeds required to effectively ship over long distances.

Furthermore, both air and railroad systems suffer from cargo losses due to theft and to highjacking, and both are dependent on hydrocarbon fuels for their means of propulsion. Recently, the cost of such hydrocarbon fuels has increased to a level which could make the cost of propelling the vehicles prohibitive in itself, even without including the other above-mentioned costs.

Therefore, an ideal cargo and passenger transportation system would be one which combines the high speed movement of an airplane with the reliability and convenience of a ground based system. A ground based transportation system similar to a railroad yet having friction factors in the order of those involved with air flight would effect such a combination. Therefore, a ground based system which could achieve speeds in the order of air flights could be developed.

Some systems have been proposed which purportedly produce efficient high-speed ground based transportation. Among these systems are the pneumatic propulsion systems. As used herein, a pneumatically powered system is one in which a vehicle is propelled in a duct as a free piston therein by establishing differential pressure between the front and rear of the vehicle in the duct. Thus, with gas in the duct in front of the vehicle at a lower pressure, and gas in the duct at a pressure which is high relative to the front gas pressure located at the rear of the vehicle, the vehicle is rapidly propelled as a free piston through the duct.

The pneumatically powered systems do not depend on hydrocarbon fuels and ground speeds approaching, and even potentially exceeding, those of air transportation systems are feasible.

However, the vehicles in most of the known pneumatically powered ground transportation systems ride on tracks or slides and hence suffer drawbacks due to friction which are similar to those drawbacks discussed above with reference to railroad transportation systems. Furthermore, due to the speeds proposed for these vehicles, shocks to, and vibration of, cargo and passengers may reach intolerably high levels. Noise may also reach intolerable levels. Frictional heating may also damage the tracks and/or the vehicle wheels thus creating safety and maintenance problems. Thus, known pneumatically powered systems utilizing tracks or slides to support and guide the vehicle have inherent drawbacks which have prevented them from gaining wide acceptance.

The so-called ground effect machines eliminate frictional resistance to vehicle movement by supporting the vehicle on pressurized air ejected from the bottom of the vehicle. However, such vehicles are not compatible with pneumatically powered vehicle systems as the pressurized air ejected from the vehicle will inhibit or destroy the vacuum conditions present ahead of the vehicle. Hence, the ground effect machine may eliminate frictional resistance to movement of the vehicle, but in doing so, may also eliminate the source of propulsion for the vehicle. Furthermore, the equipment required to produce the stream of pressurized air from the vehicle bottom must be carried onboard the vehicle, thus reducing the space available for passenger or cargo transportation.

The present invention enables a pneumatically powered vehicle to ride in a film of gas thereby reducing the energy losses due to friction to essentially negligible levels.

SUMMARY OF THE INVENTION

The device embodying the present invention traps a quantity of pressurized gas being used to propel the vehicle beneath that vehicle thereby producing a film of gas on which the vehicle rides. The film of gas is provided without interferring with the vacuum conditions created in front of the vehicle or endangering the integrity of the pressure differential across the vehicle.

Fore and aft seals are respectively mounted on the bow and stern of a vehicle. The fore and aft seals extend radially outward from the vehicle, and a horizontal seal is mounted on the vehicle to extend longitudinally on the vehicle at a location between the fore and aft seals. The fore seal is located on the bottom of the vehicle and contacts the bottom of the duct or tunnel through which the vehicle is being propelled. This configuration prevents fluid communication between the area beneath the vehicle and the evacuated area in front of that vehicle, but does allow fluid communication between the area above the vehicle and that evacuated area. The aft seal is located on the top of the vehicle and prevents fluid communication between the top of the vehicle and the rear thereof while allowing fluid communication between the bottom of the vehicle and the rear thereof. Thus, a film of pressurized gas is established by the fluid communication between the areas located under the bottom of the vehicle and in the rear thereof. The pressure differential thus established between the bottom and the top of the vehicle is sufficient to lift the vehicle so that it rests on this gas film. The seals prevent fluid communication between the pressurized gas and the evacuated area thus enabling that gas pressure to propel the vehicle. The vehicle thus rides on a film of gas and is subject to friction factors corresponding to and in some cases even less than, those encountered in air transportation systems. Thus, speeds approaching air transportation speeds are possible.

Connecting tubes extending through the fore and aft seals can be used to connect the top and bottom areas of two adjacent vehicles. Thus, a plurality of vehicles can be combined to form a train of vehicles.

A cargo handling system is located adjacent a main tunnel through which the vehicle passes. Movable tunnels connect the cargo handling area to the main tunnel to shunt the vehicle off into the cargo handling area. In the cargo handling area, vehicles can be loaded, unloaded or rearranged to form new trains.

The system embodying the teachings of the present invention can therefore be oriented to transport cargo and passengers over long distances, even cross country.

Booster stations located along the route maintain pressure and vacuum conditions and serve to assist the vehicles when those vehicles are required to traverse mountainous areas.

The vehicles used in the system embodying the teachings of the present invention are therefore capable of attaining, and sustaining, high speeds in a ground based transportation system. These speeds can potentially reach levels of one thousand miles per hour. Thus, air transportation speeds are achievable without the drawbacks of an air transportation system, or the limitations of a railroad transportation system.

Furthermore, independence from hydrocarbon fuels, and the requirement of relatively few support personnel, substantially reduces operating costs of this system as compared to air or other ground based transportation systems. Thus, the cost of transporting passengers and cargo over long distances is quite low as compared to other known transportation systems.

As the cargo handling system used in the present system is separate from the main tunnel, cargo and passengers can be loaded and unloaded without disturbing the integrity of the rest of the system or interrupting the normal flow of traffic through the system. Moreover, the passengers and cargo are normally inaccessible during transport, and theft or robbery and hijacking is practically eliminated.

OBJECTS OF THE INVENTION

Accordingly, it is a main object of the present invention to transport passengers and cargo over long distances and at high speeds.

It is another object of the present invention to handle passengers and cargo rapidly and efficiently without interrupting the normal flow of traffic through a pneumatically powered transportation system.

It is a further object of the present invention to assure the safety of cargo and passengers during the transportation thereof.

It is yet another object of the present invention to reduce the cost of operating a ground based transportation system by reducing the number of support personnel required.

It is still another object of the present invention to transport passengers and cargo without requiring the use of hydrocarbon powered vehicles.

It is yet a further object of the present invention to transport cargo and passengers in a ground based transportation system at high speeds without high noise and vibration levels.

BRIEF DESCRIPTION OF THE DRAWINGS

FIG. 5 is a plan view of a cargo handling system used in conjunction with the present invention;

FIG. 6 is a plan view of a movable tunnel section used to shunt vehicles into the cargo handling area;

FIG. 7 is an elevation view of the movable tunnel section shown in FIG. 6;

FIG. 8 is an elevation view of the cargo handling system shown in FIG. 5;

DETAILED DESCRIPTION OF THE PREFERRED EMBODIMENT

Figure 1:
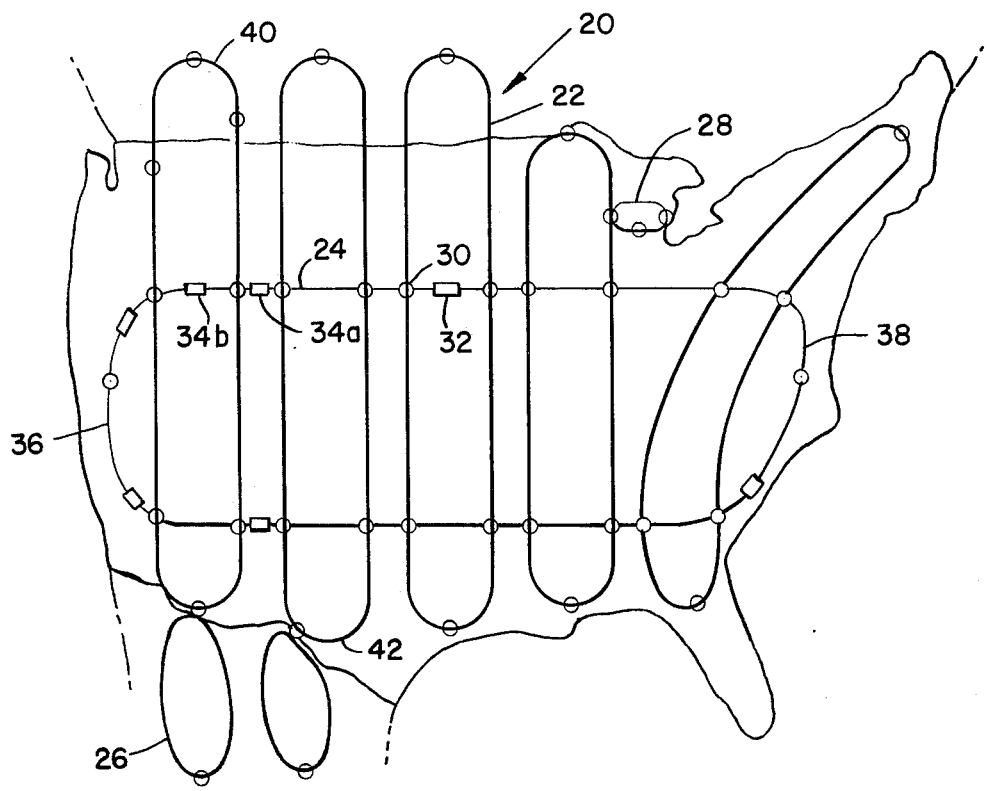
FIG. 1 is a grid network of a ground based transportation system embodying the teachings of the present invention.

Shown in FIG. 1 is a grid system 20 overlaid onto a map of the United States to depict a layout of a high-speed ground transportation system in accordance with the teachings of the present invention. As shown in FIG. 1, the high-speed ground transportation system comprises a plurality of north-south trunk lines 22 and an east-west trunk line 24. The system also comprises secondary north-south lines 26 and intercity lines such as line 28. A plurality of stations 30 are located along the major and secondary lines, and a plurality of booster stations 32 are also located at various points along the lines. Further booster stations, such as booster station 34a are located at various points along the east-west trunk line and will be discussed in greater detail below. All of the lines in the system form closed circuits so that vehicular traffic can move both ways along the lines. Thus, for example, the east-west trunk line 24 comprises turn-around lines 36 and 38, and north-south trunk lines comprise turn-around, or return reaches 40 and 42. As shown in FIG. 1, the system not only encompasses the United States, but also reaches into parts of Mexico and Canada to carry cargo and passengers from and to these countries, as well as in the United States.

The system shown in FIG. 1 represents a tunnel network used in conjunction with a pneumatically powered vehicle for transporting passengers and cargo at high speeds over long distances. The tunnels can be located anywhere and can be located underground, semi-surface, above surface, or suspended as necessary to traverse particular terrain. The materials of the tunnel are selected according to the location of the tunnel and can be reinforced concrete, or reinforced fiberglass or plastic. Of course, materials and location of the tunnel are dependent upon right-of-way, esthetic factors, and other such requirements. The tunnels are air-tight and gate valves or bulkheads, as well as booster stations, are located at various points along the tunnels to maintain the proper pressure differential across a vehicle being propelled through the tunnel by means of pneumatic pressure. Furthermore, the tunnel can also comprise pumping stations, fans, emergency exits, or auxillary systems, as the need may be. A computer, or other such control device, can be used to properly sequence the operation of the various valves, booster stations, and other support equipment to assure proper movement of the vehicles through the tunnels.

For example, a vehicle traveling east to west across the Rocky Mountains would pass booster station 34a where the pressure differential across the vehicle would receive an additional boost, and the gate valves would be located closer together to assure a high differential pressure across the vehicle. The vehicle would then pass station 34b where it would again receive another boost. The boosts given at stations 34a and 34b could be controlled according to a computer program to benefit the proper vehicle without interferring with the operation of other vehicles traveling in east-west trunk line 24. The booster stations can be located at various other points in the lines as well.

The inter-city and secondary lines can also be controlled by a master computer, or according to the computers associated therewith.

Although the system shown in FIG. 1 depicts only single lines, multiple lines can also be used to accommodate traffic moving in many directions.

Figure 2:
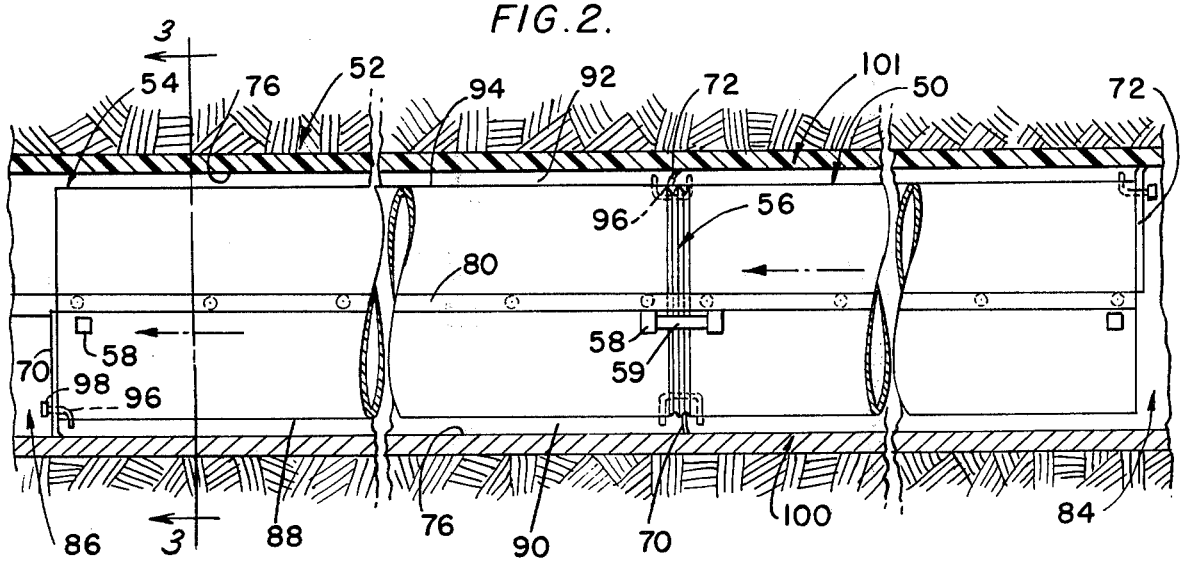
FIG. 2 is a side elevation view of a pneumatically powered vehicle positioned in a tunnel in accordance with the teachings of the present invention.

A pneumatically propelled vehicle in accordance with the teachings of the present invention is shown in FIG. 2. The vehicle 50 is positioned within duct or tunnel 52 and is adapted for propulsion as a free piston therein by establishing differential air pressure between the vehicle bow or forward end 54 and the vehicle stern or rear end 56. Couplings 58 on both ends of the vehicle enable the vehicle to be connected to other vehicles as by a suitable bar 59 to form a train of vehicles.

In the preferred embodiment, the vehicle 50 is cylindrical and has an outside diameter slightly smaller then the inside diameter of the tunnel 52. The cross sectional configuration of the vehicle 52 substantially corresponds to that of the duct.

As shown in FIG. 2, a fore seal 70 is connected to the vehicle forward end, and an aft seal 72 is connected to the vehicle rear end. The seals extend radially outward from the vehicle to contact the inner surface 76 of the tunnel 52. Therefore, the tip-to-tip distance between seals 70 and 72 corresponds to the tunnel inner diameter, while each seal only covers half of the vehicle end associated therewith. As shown, seals 70 and 72 are vertically disposed within the tunnel 52. A horizontal seal 80 extends longitudinally on the vehicle 50 from the front end thereof to the rear end thereof. For convenience, only one seal 80 is shown, however, there are at least two such seals, with another seal being of the reverse side of the vehicle 50.

For vehicle movement from right to left as shown in FIG. 2, a pressurized area 84 and an evacuated area 86 will be located on the rear and front ends of the vehicle respectively to propel that vehicle forward in accordance with the principles of pneumatic propulsion. As the vehicle outer diameter is less then the tunnel inner diameter, the vehicle bottom 88 can be spaced from the tunnel inner surface 76 thereby allowing gas to be interposed between vehicle bottom 88 and tunnel surface 76 to form an air film 90 beneath the vehicle. According to the fluid mechanics of the situation, a gap 92 will be formed between the vehicle top 94 and the tunnel inner surface 76.

The fore seal 70 prevents the air in air film 90 from by-passing the vehicle and entering evacuated area 86 without exerting a force on the vehicle. Likewise, aft seal 72 prevents air from pressurized area 84 from moving through gap 92 into evacuated area 86 to by-pass the vehicle without exerting a force thereon. The horizontal seal 80 also prevents fluid communication between the air underneath the vehicle and the evacuated space on top of the vehicle.

In the preferred embodiment, the seals 70 and 72 cover approximately half of the face area of the vehicle ends.

Because of the pressure differential between the air film 90 and the gap 92, an upward force is exerted on the bottom of the vehicle thereby supporting the vehicle away from tunnel inner surface 76 and allowing the vehicle to rest on air film 90. As the coefficient of friction associated with an air film, such as air film 90, is much lower then the coefficient of friction associated with structures such as tracks, slides, or the like, and retarding force on, and frictional losses associated with, movement of vehicle 50 through the tunnel 52 is quite low as compared to other ground based transportation systems such as railroads. The friction factors associated with the vehicle 50 and air film 90 are in the order of those friction factors encountered by air transportation systems. Hence speeds approaching aircraft speeds are obtainable by the vehicle 50. Because the friction factors associated with the vehicle 50 are similar to those associated with air transportation systems while the vehicle is still ground based, the advantages of the ground based system can be combined with the advantages of high speed transportation attendent air transportation.

Coupling tubes 96 extend through seals 70 and 72 so that there is fluid communication between the air films and gaps of connected vehicles in a train. When a single vehicle is being propelled, the coupling tubes are capped off by caps 98.

The vehicle 50 is optionally air-tight and may contain the usual life support and comfort systems associated with passenger transportation. Furthermore, in the preferred embodiment, the tunnel lower portion 100 is made of concrete and the tunnel upper portion 101 is made of reinforced fiberglas or plastic.

It is noted that the air pressure in pressurized area 84 may have to be maintained at a level which is higher then normally required for pneumatically powered transportation in order to provide sufficient pressure in air film 90 to elevate the extra heavy freight vehicles 50. However, the excess power required to establish the air film 90 is offset by the lower costs resulting from the high speeds obtainable with the present system.

Figure 3:
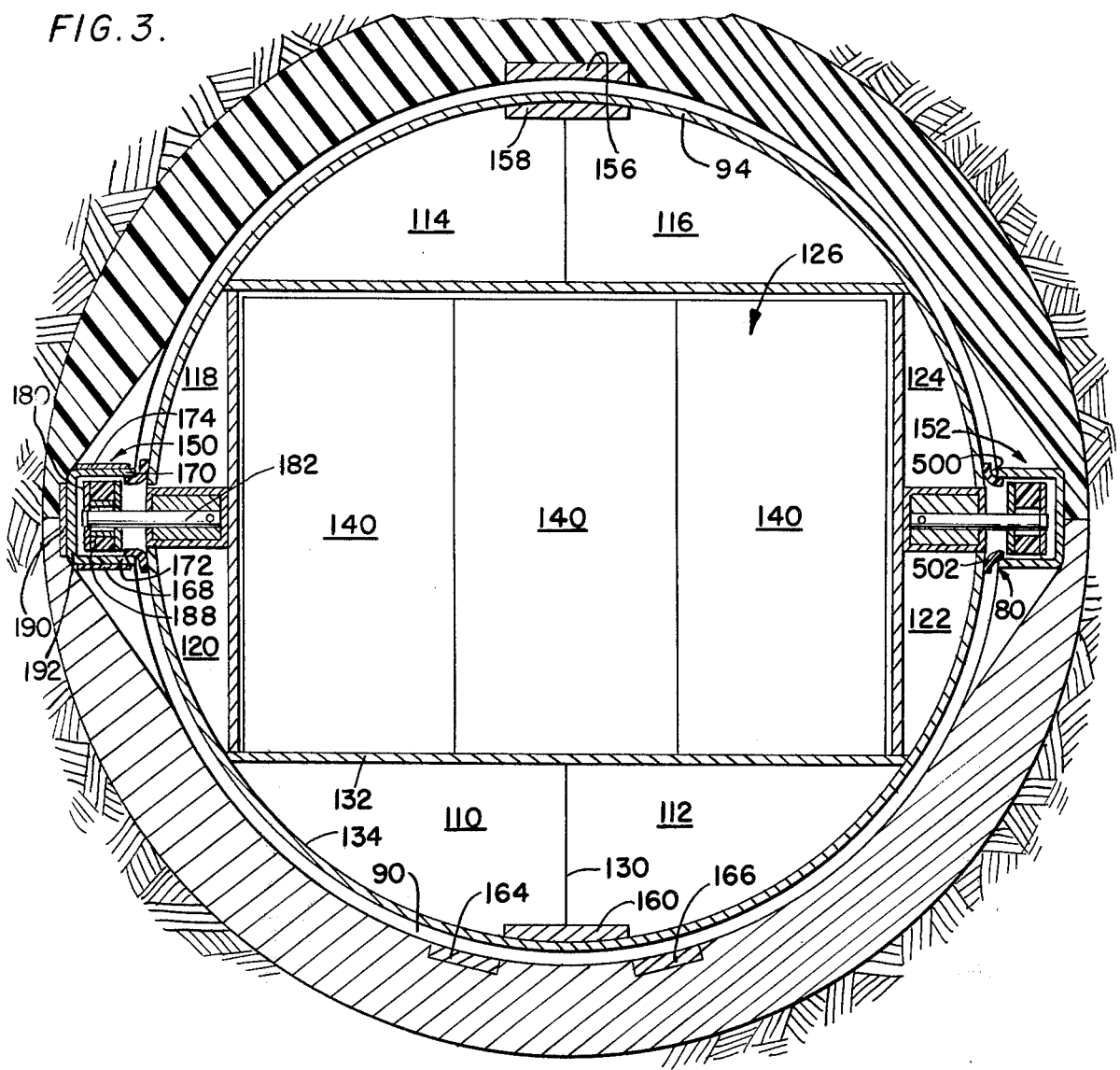
FIG. 3 is a sectional view taken along line 3—3 of FIG. 2.

A cross sectional view of the vehicle 50 is shown in FIG. 3. The inner volume of the vehicle is divided into various cargo areas such as: lower cargo areas 110 and 112; upper cargo areas 114 and 116; side cargo areas 118, 120, 122, and 124; and central cargo area 126. Bay walls such as vertical walls 130 and horizontal walls 132 are disengageably attached to the inner surface 134 of the vehicle 50. Multiple rows of containers, such as containers 140 can be stored in the central storage area 126, or alternatively passenger seating can be substituted for the various cargo storage areas. The systems for effecting such cargo storage are well known in the air transportation art.

At high speeds, the vehicle riding on an air film such as air film 90 may tend to roll as it is propelled through the tunnel 52. Therefore, the vehicle 50 comprises a system for stabilizing that vehicle into an upright orientation and eliminating the pitch, yaw, and roll which may attend the movement thereof. As shown in FIG. 3, the tunnel 52 comprises two longitudinally directed grooves 150 and 152 which cooperate with the longitudinal seal 80. The grooves 150 and 152 run the entire length of the tunnel 52 and, as will be later discussed, forms wheelways as well as seal receiving tracks. As shown in FIG. 3, the stabilizing system comprises a pair of cooperating field generating or producing means 156 and 158 located in the vehicle top 94, and another field producing means 160 located in the vehicle bottom 88 at a point which is diametrically opposed to the field generating means 156 and 158 cooperate to attract means 156 to means 158 thereby orienting means 156 at the upper-most position with respect to the bottom of the tunnel. The field producing means 158 runs longitudinally of tunnel 52 for the entire length thereof, and the field generating means 156 runs longitudinally of vehicle 50 for the entire length thereof, as does field producing means 160. Also located in the bottom of tunnel 52 are field generating means 164 and 166 which generate fields which repel the field generating means 160 thereby cooperating with the attractive fields of means 156 and 158 to maintain the vehicle 50 in a upright orientation. Further field generating means 168 and 170 are located on the bottom wall 172 and top wall 174 of the grooves 150. The field generating means 168 and 170 cooperate with field generating means 180 attached to an axle 182 of the vehicle 50 to attract the means 180 and hold that means in an upright orientation. Further, field generating means 186 and 188 located in axle 182 cooperate with field producing means 190 in sidewall 192 and the field generating means 168 and 170 to maintain the axles in a vertical orientation, such as that shown in FIG. 3.

Figure 4:
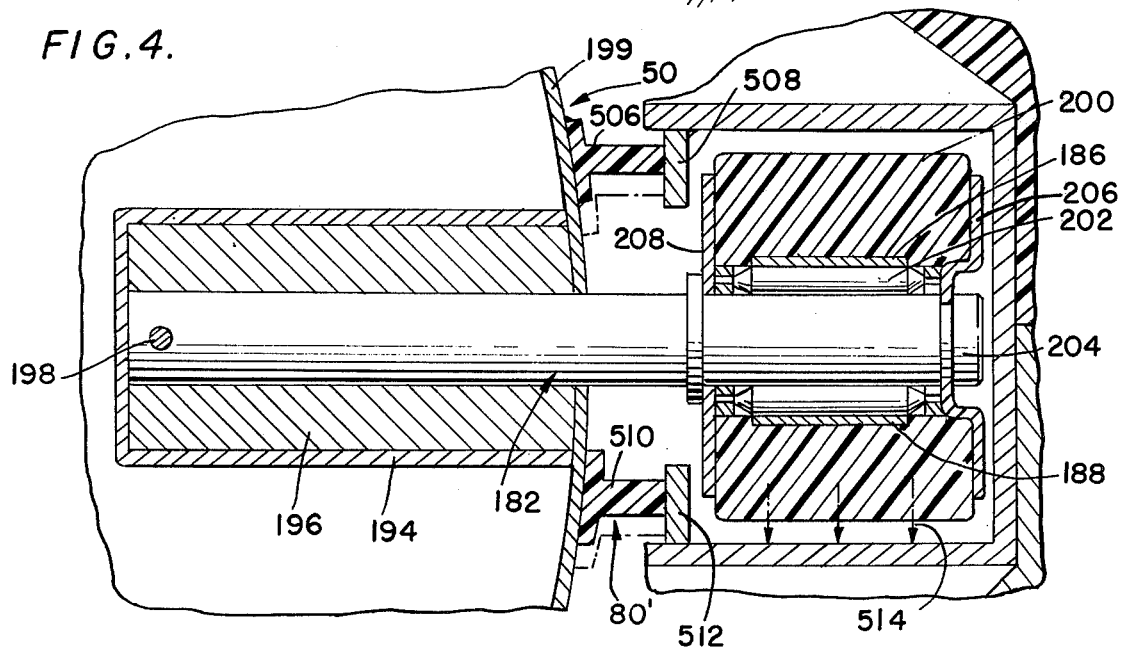
FIG. 4 is a detailed fragmentary view of a wheeled supporting means used in conjunction with the pneumatically powered vehicle of the present invention.

FIG. 4 shows a further detail of the axle 182. As shown in FIG. 4, the axle 182 is mounted on a vehicle 50 by a housing 194 and a reinforcement means 196 connected to the axle by a pin 198.

The axle extends outwardly from the vehicle wall 199 and has a wheel 200 mounted thereon by a roller bearing 202, end cap 204, outboard end plate 206 and inboard end plate 208. The wheels sit down onto bottom walls 172 of the grooves 150 and 152 to support the vehicle when the air film 90 has broken down. There are a plurality of wheels mounted as in FIG. 4 on each side of the vehicle 50, and the wheels in the preferred embodiment are urethane.

In the preferred embodiment, the ground based transportation system would be comprised of various size vehicles and various size tunnels. The size of the tunnel and the vehicle traveling therethrough is determined according to the usual considerations given to such transportation system.

Shown in FIGS. 5 through 11 is a cargo handling system. As shown in FIG. 6, a main tunnel 220 is broken at section 222. A movable tunnel section comprised of a main section 224 and a shunt section 226 is interposed between the broken main tunnel portions to connect the first portion 230 to a second portion 232 of the main tunnel. The movable tunnel sections are mounted on a tunnel shifter 236 and are hingably connected to second portion 232 of the main tunnel by a hinge 238. The shunt section 226 is connected to a deceleration tunnel 240. Thus, by properly orienting movable section 222, a vehicle can either be shunted into deceleration tunnel 240, or allowed to pass into second portion 232. As shown in FIG. 7, the deceleration tunnel is elevated above second portion 232 to cause the vehicle to move up-hill thereby aiding in the deceleration process. Cables and/or other connecting means can also be connected to hoisting means to elevate the cables and/or tubes as desired.

As shown in FIG. 8, a deceleration tunnel comprises a surge tank 250 connected thereto via conduit 252 having check valve 254 therein and exhaust header 256 located inside the deceleration tunnel 240. The deceleration tunnel 240 is pressurized so that a vehicle moving thereinto encounters a cushion of air in place of the evacuated area 86. The cushion of air arrests the movement of the vehicle until that vehicle is stopped at a point adjacent exhaust header 256.

Immediately adjacent exhaust header 256 is a sliding door 260 which interfaces deceleration tunnel 240 with a storage tube 262 located on a storage apron 264 and supported by brace means 266. The sliding door 260 is opened to admit the vehicle into the storage tube, and various sliding doors appropriately located in deceleration tube 240 seal off that tube from the main tunnel to prevent deterioration of the pressure conditions in that main tunnel. The distance over which the pressure in deceleration tube 240 is present is determined according to such factors as the speed of vehicle 50, its momentum, or the like.

As shown in FIG. 5, storage apron 264 comprises a plurality of storage tubes 262 which are moved across the apron on rails 280. Thus, each storage tube 262 can store a full train of vehicles and can be moved laterally away from the interface at sliding door 260 in either direction. The vehicles from the trains can then be sorted in either revolving sorter 290 or on translating sorter 292.

Figure 10:
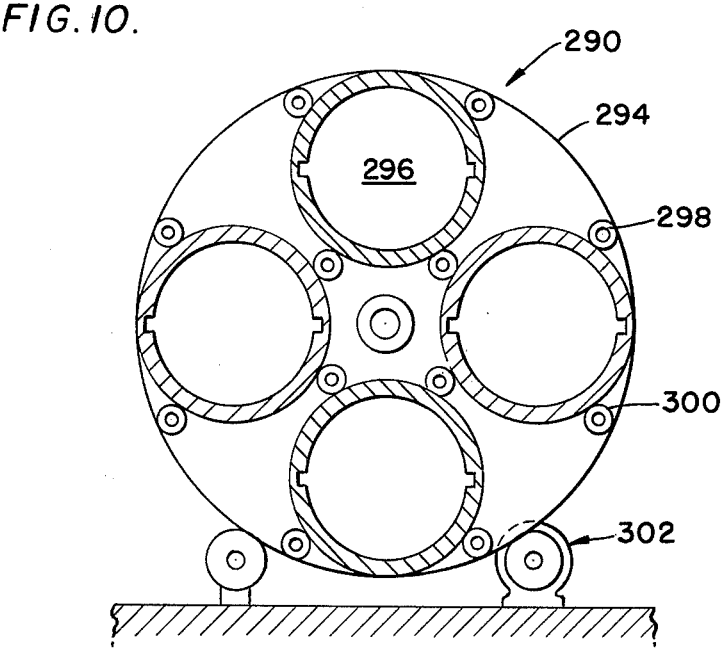
FIG. 10 is a sectional view of a revolving sorter taken along line 10—10 shown in FIG. 5.

The revolving sorter is best shown in FIG. 10 and comprises a casing 294 encasing a plurality of vehicle receiving compartments, or storage cells 296. Each storage cell is contacted by guide rollers 298 and motor driven rollers 300 to maintain the upright orientation of the vehicle as the revolving sorter 290 rotates. A pair of motor driven rollers 302 contact the outer surface of casing 294 to rotate the revolving sorter 290. Other mechanical connections between the rollers 302 and the casing 294, as well as the rollers 300 and the storage cells 296 can be used. The vehicles are moved into appropriate storage cells, and the sorter is rotated to align that vehicle with an appropriate make-up tube 310 located on make-up apron 312.

Figure 9:
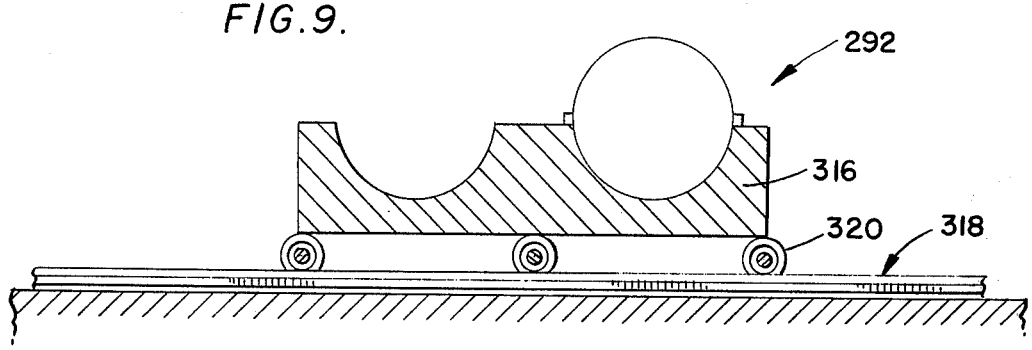
FIG. 9 is a sectional view taken along line 9—9 of FIG. 5.

The translating sorter 292 is best shown in FIG. 9, and it comprises a plurality of cradlelike cars 316 mounted on sorting apron 318 by wheels 320. The cars 316, like the revolving sorter 290, move the vehicle from the storage tubes 262 to the make-up tubes 310 to make up an appropriate train and/or load and unload cargo or passengers.

Figure 11:
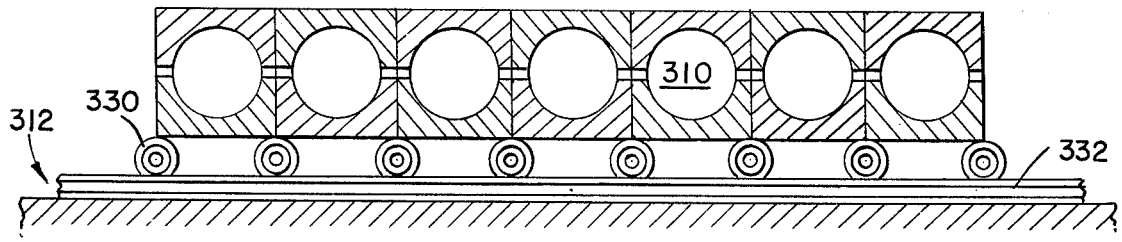
FIG. 11 is a sectional view of the make-up apron taken along line 11—11 in FIG. 5.

As shown in FIG. 11, make-up tubes 310 are mounted on make-up apron 312 by wheels 330 and are guided by tracks 332. The trains in the make-up tubes are then moved to acceleration tube 361 according to a chosen sequence by moving the clustered make-up tubes on the tracks 332.

Appropriate moving means, such as chains or the like, can be used to move the vehicles through the cargo-handling section 360.

As shown in FIGS. 5 and 8, acceleration tube 361 is similar to deceleration tunnel 240 and comprises a sliding door 362 upstream of an influent header 364 which is located in acceleration tube 361 and is connected to a secondary storage tank 366 by a conduit 368. Secondary storage tank 366 is connected to surge tank 250 by conduit 370, and check valves 372 and 374 are located in conduit 370 on either side of a pump 378. The pressurized air forced into surge tank 250 during the deceleration of the vehicle in deceleration 240 is used to accelerate the vehicle in acceleration tube 361, which is connected to the main tunnel by a suitable connecting means, such as a branch connection, back up to transporting velocity. The pump 378 serves to transfer air from tank 50 into secondary tank 366.

As is also shown in FIG. 5, a trunk line changing section 380 is located adjacent acceleration tube 361, and can be used to transfer trains from the make-up section to a trunk line running in another direction from that line from which the vehicle was removed. The changing section 380 can also be used to transfer vehicles from a major trunk line to secondary systems, such as intercity system 28 or secondary system 26. The changing section 380 is connected to the appropriate tunnels of the connecting section in a manner which is similar to that connection between acceleration tube 361 and the main tunnel.

Cargo handling system of varying sizes can be located throughout the transportation system, and can be used to store unused vehicles or as vehicle servicing areas.

Figure 12:
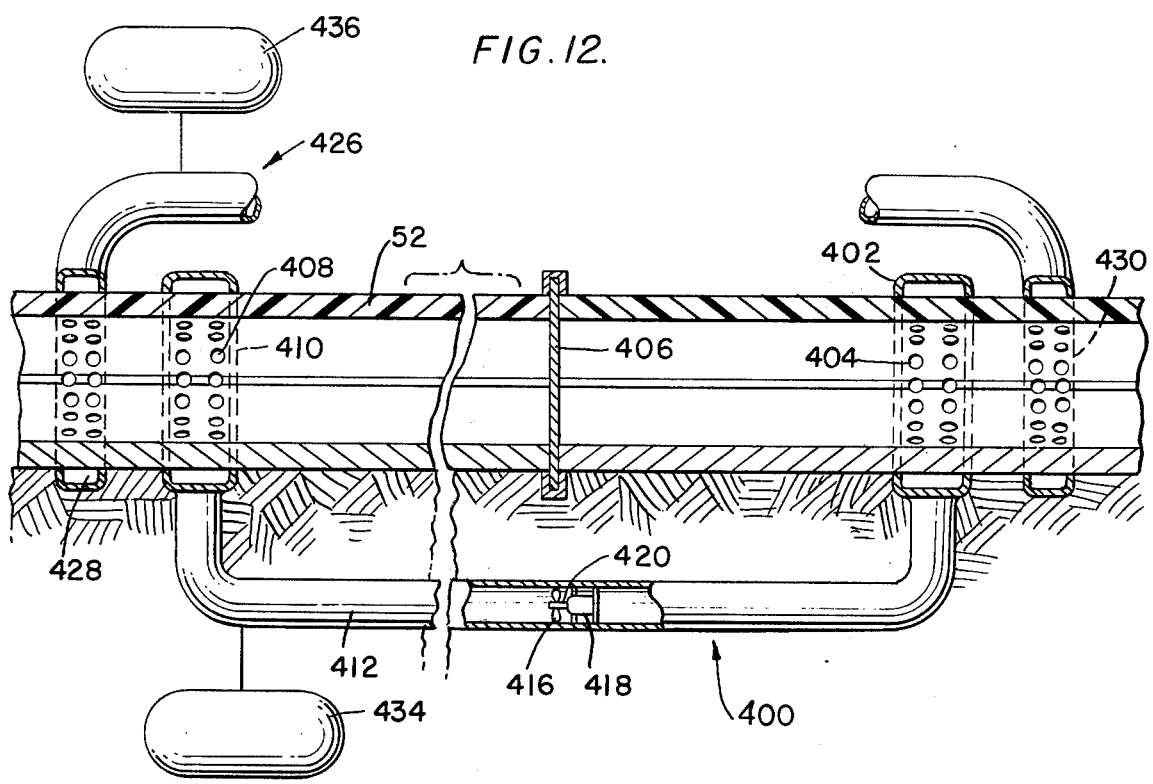
FIG. 12 is a plan view of an air booster system used in conjunction with the device embodying the present invention.

Shown in FIG. 12 is an air booster system 400 which can be used at various points along the tunnel or at the mountain booster stations 34a, or 34b. The air booster system 400 comprises an inlet header 402 having a plurality of intake ports 404 therein positioned in the tunnel 52 upstream of a sliding door 406 and connected to an exhaust header 408 having a plurality of exhaust jets 410 therein by a conduit 412. A fan 416 mounted on a motor 418 by a shaft 420 is mounted in conduit 412 between inlet header 402 and exhaust 408, which is located upstream of sliding door 406. A similar system 426 can be located on the other side of the tunnel 52 with exhaust header 428 located upstream of exhaust header 408 and the inlet header 430 located downstream of inlet header 402. The booster stations can be located at various points in the system to make up frictional losses, or to decelerate vehicles on long downhill reaches As a vehicle passes exhaust header 408 moving from left to right in FIG. 12, fan 416 is actuated to move air from the tunnel via inlet header 402 and reinsert that air into the tunnel via exhaust header 408. Thus, the air booster system 400 serves to increase the pressure in pressurized area 84 and decrease the pressure in evacuated area 86 thereby increasing the pressure differential across the vehicle 50 to give an additional propulsive force thereto. The sliding door 406 can be operated so that a boost given to one vehicle will not endanger the integrity of the pressure differential existing across another vehicle located in tunnel 52 and trailing the first vehicle to which the boost is given.

Storage tanks 434 and 436 can be used to store the air withdrawn from the tunnel until the trailing vehicle has passed the exhaust headers.

Figure 13:
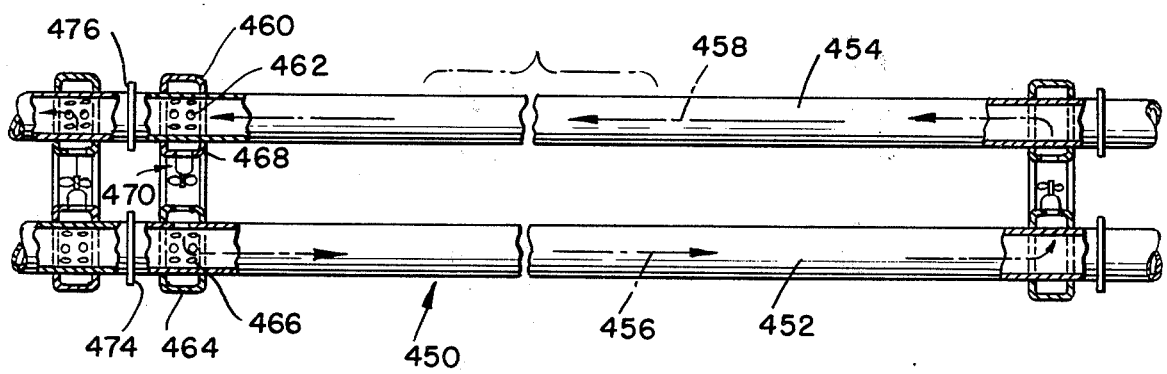
FIG. 13 is a plan view of a dual line booster system used in conjunction with the ground based transportation system embodying the teachings of the present invention.

Shown in FIG. 13, is a booster system 450 used in dual-line systems. The dual-line systems would comprise tunnels 452 and 454 wherein vehicles run in the direction of arrows 456 and 458.

The air booster system 450 comprises inlet headers 460 having inlet jets 462 therein connected to exhaust headers 464 having exhaust jets 466 therein by conduits 468 having fans 470 located therein. Sliding doors 474 and 476 are located in the tunnels downstream of the inlet header 460 and upstream of the exhaust header 464 (with the flow direction being taken as the direction of vehicle movement) respectively. The sliding doors are closed or opened as the the vehicle moves through the booster system so that the area in front of the vehicle is further evacuated and the area behind the vehicle is further pressurized. Check valves can also be located in the tunnels to prevent loss of propulsive air from one tunnel as a vehicle in the next tunnel is being boosted. Appropriate controls can also be placed on the booster system to actuate it, or deactuate it, according to the movement of vehicles in the tunnels 452 and 454.

In operation, the ground base system embodying the teachings of the present invention produces high speed vehicular movement through a tunnel network which can be used to transport passengers and/or cargo over very long distances. Appropriate sections of the tunnels are pressurized and evacuated to establish a pressure differential across a vehicle moving through the tunnel and thereby propel it according to the pressure differential existing thereacross. The vehicle rides on a cushion of air in the tunnel and can be shunted into cargo handling systems to be loaded, unloaded, placed in a train of vehicles, changed to other trains, diverted to other tunnels, or stored. Furthermore, booster stations located at various points in the system serve to increase the pressure differential existing across a vehicle to assist that vehicle up inclines in mountainous areas. The magnetic stabilization system serves to maintain the vehicle in an upright orientation throughout its movement through the ground transportation system.

The seal 80 is best shown in FIGS. 3 and 4. As shown in FIG. 3, seal 80 comprises an upper element 500 and a lower element 502. The elements 500 and 502 are attached either to the vehicle 50 or to the grooves 150 in a manner so that they will be replacable, yet seal the gap 92 from the air film 90. Thus, for example, elements 500 and 502 can be flexible so that the vehicle wheels can contact the grooves 150 with element 500 attached to the vehicle and element 502 attached to the groove 150, or vice versa. Alternatively, both elements 500 and 502 can be attached to either the vehicle or to the groove and in sliding engagement with the groove or the vehicle respectively. The element 500 and 502 can be an elastomeric material or any other suitable flexible material.

In the preferred embodiment, the elements are both attached to the vehicle and slidably engage the groove 150.

An alternative form of the seal, 80', is shown in FIG. 4 and comprises upper element 506 attached to the vehicle and slidably engaging shoulder 508 attached to groove 150 along the length thereof. A lower element 510 is attached to vehicle 50 and slidably engages shoulder 512 fixed in groove 150 along the length thereof.

As shown in FIG. 4, when the vehicle is elevated by the air film, the elements 506 and 510 engage the shoulder 508 and 510 near the middle thereof as shown by the solid lines in FIG. 4. When the vehicle is being supported by the wheels, the wheels move downwardly as show by arrows 514 in FIG. 4 and the elements 506 and 510 move downwardly to engage shoulder 508 and 512 as indicated by the dotted line in FIG. 4.

Although some leakage may occur with either embodiment, such leakage will not be significant enough to interfere with the proper operation of the air film. Preferably, the seal 80 is not as wide as the groove so that the vehicle can rise to the maximum height of that groove, or set on the wheels and not have contact between the groove and the vehicle except between the lower face of the groove and the wheels.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims:

What is claimed is:

1. A high-speed ground transportation system comprising:
   a gas-filled tunnel having wheel ways defined therein;
   a vehicle located in said tunnel; means operatively connected with said tunnel for selectively pressurizing and evacuating portions of said tunnel to create a pressure differential across the vehicle located therein to propel said vehicle therethrough;
   said vehicle having a top and bottom and upright seal means slidably contacting said tunnel and positioned on said vehicle in a manner such that said vehicle top is exposed to an evacuated portion of said tunnel and said vehicle bottom is exposed to a pressurized portion of said tunnel so that pressurized gas is located beneath said vehicle to create a gas film on which said vehicle rides as it is propelled through said tunnel, said gas film being the sole means for supporting said vehicle during movement of said vehicle on said gas film, and a horizontal seal positioned on said vehicle to separate said top from said bottom, said horizontal seal being flexible to allow vertical movement of said vehicle;
   a plurality of wheels mounted on said vehicle for supporting same when said vehicle is not supported on said gas film, said wheels being mounted on said vehicle to be located in said tunnel wheelways; and
   a magnetic stabilizing means for stabilizing said vehicle and including first field generating means mounted on said vehicle, first field producing means mounted on said tunnel to cooperate with said first field generating means, second field producing means mounted on said vehicle wheels, and second field generating means located in said tunnel wheelways to cooperate with said second field producing means to maintain said vehicle stable.

2. The transportation system of claim 1 wherein said tunnel has a top and a bottom and said vehicle has a front and a rear and wherein said upright seal means includes a first seal positioned on said vehicle front to contact said tunnel bottom and, a second seal positioned on said vehicle rear to contact said tunnel top.

3. The transportation system of claim 1 wherein said vehicle is a hollow cylinder.

4. The transportation system of claim 3 wherein said tunnel includes a main section and an auxiliary section wherein said vehicle can be combined with other vehicles to form a train of vehicles, and coupling means for coupling said auxiliary sections to said main section.

5. The transportation system of claim 4 wherein said coupling means includes a movable tunnel section connected to said auxiliary section for coupling that section to said main section; and means connected to said movable tunnel section for selectively moving that section into and out of connecting engagement with said main section to selectively couple and decouple said main and auxiliary sections so that when said movable tunnel section is in connecting engagement with said main section, said main and auxiliary sections are coupled and a vehicle being propelled through said main section is diverted into said auxiliary section, and when said movable tunnel section is out of connecting engagement with said main section, said main and auxiliary sections are decoupled and a vehicle being propelled through said main section passes by said auxiliary section without being diverted thereinto.

6. The transportation system of claim 5 wherein said auxiliary section further includes a storage means for temporarily storing said train, a revolving sorter means located adjacent said storage means and connected thereto to receive vehicles from said storage means, said revolving sorter means having vehicle storage cells into which vehicles are moved from said storage means for moving said vehicles away from said train, a translatory sorter means located adjacent said storage means and connected to said storage means to receive vehicles from said storage means, said translatory sorter means having vehicle carrying means into which said vehicles are moved from said storage means for moving said vehicles away from said train, train make-up means located adjacent said storage means and connected to said sorter means to receive vehicles therefrom for forming another train, another coupling means connecting said make-up section to said tunnel main section, and vehicle moving means connected to said auxiliary section for moving said vehicles through said auxiliary section.

7. The transportation system of claim 6 further including a vehicle motion arrester connected to said coupling means to stop said vehicle.

8. The transportation system of claim 7 wherein said coupling means includes an entrance tunnel section connected to said storage means and said another coupling means includes an exit tunnel section connected to said make-up means.

9. The transportation system of claim 8 further including a booster system including a surge tank connected to said motion arrester and fluidly connected to said exit tunnel section for transferring gas from said motion arrester to said exit tunnel for accelerating said vehicle through said another coupling means into said main tunnel.

10. The transportation system of claim 9 further including a booster station havng a fan fluidly connected to said main tunnel at two spaced apart locations to transfer gas from one of said locations to the other location for increasing the gas pressure at said other location while decreasing gas pressue at said one location whereby the pressure differential across a vehicle located in said tunnel between said spaced apart locations is increased.

11. The transportation system of claim 10 further including a secondary tunnel adjacent said main tunnel wherein said vehicle is propelled in a direction opposite to the direction in which said vehicle is being propelled through said main tunnel.

12. The transportation system of claim 11 further including spaced apart booster fans fluidly communicating with said main and secondary tunnels to move gas therebetween for increasing the pressure differential across said vehicles being propelled through said main and secondary tunnels and located therein between said spaced apart booster fans.

13. The transportation system of claim 1 wherein said gas-filled tunnel comprises a concrete lower portion and an upper portion made of plasticlike material.

14. A high-speed ground transportation system comprising:
a gas-filled tunnel havng wheelways defined therein and means for selectively pressurizing and evacuating portions of said tunnel to create a pressure differential across a vehicle located in said tunnel to propel said vehicle there-through, said tunnel having a main section and an auxiliary section wherein said vehicle can be combined with other vehicles to form trains of vehicles;
means on said vehicle for trapping gas beneath said vehicle to create a gas film beneath said vehicle on which said vehicle rides as it is propelled through said tunnel, said vehicle having a plurality of wheels mounted thereon to be located in said wheelways for supporting said vehicle when said vehicle is not supported on said gas film;
a magnetic stabilizing means for stabilizing said vehicle and including first field generating means mounted on said vehicle, first field producing means mounted on said tunnel to cooperate with said first field generating means, second field producing means mounted on said vehicle wheels, and second field generating means located in said tunnel wheelways to cooperate with said second field producing means to maintain said vehicle stable;
a movable tunnel section connected to said auxiliary section for coupling that section to said main section; and
means connected to said movable tunnel section for selectively moving that section into and out of connecting engagement with said main section to selectively couple and decouple said main and auxiliary sections so that when said movable tunnel section is in connecting engagement with said main section, said main and auxiliary sections are coupled and a vehicle being propelled through said main section is diverted into said auxiliary section, and when said movable tunnel section is out of connecting engagement with said main section, said main and auxiliary sections are decoupled and a vehicle being propelled through said main section passes by said auxiliary section without being diverted thereinto.

15. The transportation system of claim 14 wherein said main section includes first and second parts with said first part being upstream of said second part and wherein said auxiliary section is located adjacent said second part, and said movable tunnel section couples said auxiliary section to said first parts and further including another movable tunnel section connected to said main section second part for coupling said second part to said first part and connected to said moving means so that when said movable tunnel section is out of connecting engagement with said first part, said another movable tunnel section is in connecting engagement with said first part so that a vehicle being propelled in said main tunnel section passes from said tunnel first part to said tunnel second part via said another movable tunnel section.

16. The transportation system of claim 15 further including a second coupling means coupling said auxiliary section to said tunnel second part.

17. The transportation system of claim 16 further including a booster section for increasing the pressure differential across a vehicle in said tunnel by moving gas from a location in front of said vehicle to a location behind said vehicle.

18. The transportation system of claim 17 further including a plurality of booster sections located in said main tunnel and at least one booster section located in said auxiliary tunnel section.

19. The transportation system of claim 18 further including a secondary tunnel located adjacent said main tunnel wherein vehicles are propelled in a direction opposite to the direction of vehicles in said main section.

* * * * *